United States Patent
Won et al.

(10) Patent No.: US 11,323,934 B2
(45) Date of Patent: May 3, 2022

(54) SESSION CONTEXT CONVERSION

(71) Applicant: Nokia Technologies Oy, Espoo (FI)

(72) Inventors: Sung Hwan Won, Seoul (KR); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/357,887

(22) Filed: Mar. 19, 2019

(65) Prior Publication Data
US 2019/0313310 A1    Oct. 10, 2019

Related U.S. Application Data

(60) Provisional application No. 62/655,165, filed on Apr. 9, 2018.

(51) Int. Cl.
*H04W 36/14* (2009.01)
*H04W 36/30* (2009.01)
(Continued)

(52) U.S. Cl.
CPC ........... *H04W 36/14* (2013.01); *H04W 28/16* (2013.01); *H04W 36/0033* (2013.01);
(Continued)

(58) Field of Classification Search
CPC ..... H04W 36/14; H04W 36/30; H04W 28/16; H04W 36/0033; H04W 88/08; H04W 36/0022; H04W 76/16
See application file for complete search history.

(56) References Cited

U.S. PATENT DOCUMENTS 9,003,004 B2 *   4/2015  Cho ................. H04W 60/04
                                                    709/223
9,794,047 B2 * 10/2017  Wang ................ H04L 5/0096
(Continued)

FOREIGN PATENT DOCUMENTS

CN      102595362 A      7/2012
CN      106465193 A      2/2017
(Continued)

OTHER PUBLICATIONS

International Search Report and Written Opinion for Application No. PCT/EP2019/056934 dated May 10, 2019, 12 pages.
(Continued)

*Primary Examiner* — Ayaz R Sheikh
*Assistant Examiner* — Faiyazkhan Ghafoerkhan
(74) *Attorney, Agent, or Firm* — Alston & Bird LLP (57) ABSTRACT

In some example embodiments, there may be provided a method that includes receiving, at a user equipment while being served by a first system and during protocol data unit session establishment or modification procedure, a message including an access point name aggregate maximum bit rate value; and when there is an inter-system change from the first system to the second system, setting, at the user equipment, the access point name aggregate maximum bit rate value of a session management context for the second system to the received access point name aggregate maximum bit rate value received while being served by the first system. Related systems, methods, and articles of manufacture are also described.

26 Claims, 5 Drawing Sheets

(51) Int. Cl.
  *H04W 28/16* (2009.01)
  *H04W 36/00* (2009.01)
  *H04W 88/08* (2009.01)
  *H04W 76/16* (2018.01)

(52) U.S. Cl.
  CPC ........ *H04W 36/30* (2013.01); *H04W 36/0022* (2013.01); *H04W 76/16* (2018.02); *H04W 88/08* (2013.01)

(56) References Cited

U.S. PATENT DOCUMENTS

| | | | | |
|---|---|---|---|---|
| 10,264,491 | B2* | 4/2019 | Yuan | H04W 24/04 |
| 10,341,239 | B2* | 7/2019 | Lee | H04L 47/20 |
| 2009/0225719 | A1* | 9/2009 | Zhi | H04L 47/70 |
| | | | | 370/329 |
| 2011/0080870 | A1* | 4/2011 | Bhalla | H04W 24/02 |
| | | | | 370/328 |
| 2011/0138066 | A1* | 6/2011 | Kopplin | H04L 47/14 |
| | | | | 709/228 |
| 2011/0182268 | A1* | 7/2011 | Akhtar | H04W 36/0022 |
| | | | | 370/331 |
| 2012/0209978 | A1* | 8/2012 | Cho | H04W 60/04 |
| | | | | 709/223 |
| 2013/0223385 | A1* | 8/2013 | Zhi | H04L 47/70 |
| | | | | 370/329 |
| 2014/0169299 | A1* | 6/2014 | Wang | H04L 5/0096 |
| | | | | 370/329 |
| 2014/0295838 | A1* | 10/2014 | Won | H04L 5/0035 |
| | | | | 455/435.1 |
| 2015/0189637 | A1* | 7/2015 | Zhou | H04W 72/044 |
| | | | | 370/231 |
| 2016/0080578 | A1* | 3/2016 | Stenfelt | H04W 8/20 |
| | | | | 455/406 |
| 2016/0344635 | A1* | 11/2016 | Lee | H04L 47/20 |
| 2016/0381620 | A1 | 12/2016 | Panaitopol et al. | |
| 2017/0019816 | A1* | 1/2017 | Yuan | H04W 24/04 |
| 2017/0359749 | A1* | 12/2017 | Dao | H04W 24/08 |
| 2018/0376384 | A1* | 12/2018 | Youn | H04W 36/0022 |
| 2019/0053105 | A1* | 2/2019 | Park | H04W 36/023 |
| 2019/0053148 | A1* | 2/2019 | Lee | H04W 8/12 |
| 2019/0124561 | A1* | 4/2019 | Faccin | H04W 8/02 |
| 2019/0124671 | A1* | 4/2019 | Starsinic | H04W 72/1205 |
| 2019/0159157 | A1* | 5/2019 | Gupta | H04W 60/005 |
| 2019/0174449 | A1* | 6/2019 | Shan | H04W 60/00 |
| 2019/0174466 | A1* | 6/2019 | Zhang | H04L 5/0048 |
| 2019/0182718 | A1* | 6/2019 | Shan | H04W 60/04 |
| 2019/0261260 | A1* | 8/2019 | Dao | H04W 48/18 |
| 2019/0289506 | A1* | 9/2019 | Park | H04W 76/27 |
| 2019/0313310 | A1* | 10/2019 | Won | H04W 36/30 |
| 2019/0335532 | A1* | 10/2019 | Kim | H04W 12/06 |
| 2019/0342851 | A1* | 11/2019 | Shan | H04W 76/11 |
| 2019/0394625 | A1* | 12/2019 | Kim | H04W 12/06 |
| 2020/0068445 | A1* | 2/2020 | Wu | H04W 36/14 |
| 2020/0128432 | A1* | 4/2020 | Youn | H04L 47/805 |
| 2020/0154350 | A1* | 5/2020 | Dao | H04W 36/0009 |
| 2020/0187043 | A1* | 6/2020 | Xin | H04W 48/16 |
| 2021/0235267 | A1* | 7/2021 | Kim | H04W 76/00 |

FOREIGN PATENT DOCUMENTS

| | | |
|---|---|---|
| CN | 107667509 A | 2/2018 |
| RU | 2649873 C2 | 4/2018 |
| WO | WO 2017/032413 A1 | 3/2017 |
| WO | WO 2017/201157 A1 | 11/2017 |
| WO | WO 2018/202094 A1 | 11/2018 |

OTHER PUBLICATIONS

*Handling of Mapped EPS QoS Parameters in IWK With EPC*, Ericsson, S2-182674, vol. SAWG2 (Mar. 19, 2018).
*23.502 QoS Mapping for 5GC-EPC Interworking*, S2-174554, vol. SA WG2 (Jun. 25, 2017).
*QoS Rules and Mapped EPS Bearer Contexts*, Huawei et al., 3GPP Draft; C1-182824, vol. CT WG1 (Apr. 20, 2018).
"3rd Generation Partnership Project; Technical Specification Group Services and System Aspects; Procedures for the 5G System; Stage 2 (Release 15)", 3GPP TS 23.502, V15.1.0, Mar. 2018, pp. 1-285.
"3rd Generation Partnership Project; Technical Specification Group Core Network and Terminals; Non-Access-Stratum (NAS) protocol for 5G System (5GS); Stage 3 (Release 15)", 3GPP TS 24.501, V1.0.0, Mar. 2018, 255 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.3.0, Mar. 2018, pp. 1-405.
"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.
Office Action for U.S. Appl. No. 16/763,179 dated Nov. 25, 2020.
Office Action for Bangladesh Application No. 67/2019 dated Aug. 27, 2020.
Extended European Search Report for European Application No. 21150065.7 dated Feb. 11, 2021, 7 pages.
International Preliminary Report on Patentability (Chapter II) for Application No. PCT/EP2019/056934 dated Mar. 13, 2020, 18 pages.
Office Action for Russian Application No. 2020136184/07 dated Feb. 4, 2021, 15 pages.
Final Office Action for U.S. Appl. No. 16/763,179 dated May 20, 2021.
Cisco Systems et al., "Capturing Impacts to 23.401 Procedure for Interworking with 5GC", 3GPP TSG-SA2 Meeting #126, S2-182647, (Feb. 26-Mar. 2, 2018), 5 pages.
Decision to Grant for Japanese Application No. 2020-555139 dated Apr. 8, 2021, 4 pages.
Decision to Grant for Japanese Application No. 2021-089337 dated Oct. 20, 2021, 6 pages.
Decision to Grant for Russian Application No. 2020136184/07 dated Jun. 24, 2021, 11 pages.
Nokia et al., "APN-AMBR in the Parameters of a Defulat QoS Rule", 3GPP TSG-CT WG1 Meeting #110, C1-182329, (Apr. 16-20, 2018), 12 pages.
Notice of Acceptance for Australian Application No. 2019252455 dated Jul. 2, 2020, 3 pages.
Notice of Acceptance for Australian Application No. 2020256408 dated Jun. 29, 2021, 3 pages.
Office Action for Australian Application No. 2019252455 dated Jun. 1, 2020, 3 pages.
Office Action for Australian Application No. 2020256408 dated Apr. 20, 2021, 4 pages.
Office Action for Australian Application No. 2020256408 dated Jan. 16, 2021, 3 pages.
Office Action for Canadian Application No. 3,082,640 dated Jul. 9, 2020, 4 pages.
Office Action for Canadian Application No. 3,082,640 dated Jun. 1, 2021, 4 pages.
Office Action for Chinese Application No. 201980024877.5 dated Jun. 23, 2021, 13 pages.
Office Action for Korean Application No. 10-2020-7030172 dated Dec. 11, 2020, 6 pages.
Office Action for Taiwan Application No. 108111750 dated Dec. 26, 2019, 15 pages.
Vodafone et al., "Handling of Extended EPS Quality of Service IE and Extended APN-AMBR IE", 3GPP TSG-CT WG1 Meeting #106, C1-174350, (Oct. 23-27, 2017), 26 pages.
Non-Final Office Action for U.S. Appl. No. 16/763,179 dated Jan. 5, 2022.
Office Action for Chilean Application No. 202002590 dated Dec. 28, 2021, 21 pages.
First Examination Report for Indian Application No. 202027048708 dated Dec. 8, 2021, 8 pages.
Office Action for Japanese Application No. 2021-206124 dated Feb. 24, 2022, 6 pages.

(56) References Cited

OTHER PUBLICATIONS

Huawei, "Update of 4G to 5G interworking handover with Nx interface", SA WG2 Meeting #122, S2-175311, (Jun. 26-30, 2017), 11 pages.
Huawei, "Update of 4G to 5G interworking handover with Nx interface", SA WG2 Meeting #122, S2-175293, (Jun. 26-30, 2017), 11 pages.
Huawei, "Update of 4G to 5G interworking handover with Nx interface", SA WG2 Meeting #122, S2-175158, (Jun. 26-30, 2017), 11 pages.
LG Electronics, "TS 23.501: Clarification on QoS parameters sent to the UE", SA WG2 Meeting #122bis, S2-176570, (Aug. 21-25, 2017), 7 pages.
LG Electronics, "TS 23.501: Clarification on QoS parameters sent to the UE", SA WG2 Meeting #122bis, S2-176556, (Aug. 21-25, 2017), 3 pages.
LG Electronics, "TS 23.501: Clarification on QoS parameters sent to the UE", SA WG2 Meeting #122bis, S2-176487, (Aug. 21-25, 2017), 6 pages.
Huawei et al., "Pseudo-CR on architecture for interworking with E-UTRAN connected to EPC", 3GPP TSG-CT WG1 Meeting #104, C1-172411, (May 15-19, 2017), 2 pages.

\* cited by examiner

SESSION CONTEXT CONVERSION

CROSS-REFERENCE TO RELATED APPLICATION

This application claims priority to and the benefit of U.S. Provisional Patent Application No. 62/655,165, filed Apr. 9, 2018, and entitled "SESSION CONTEXT CONVERSION", which is hereby incorporated herein in its entirety for all purposes.

FIELD

The subject matter described herein relates to interworking between 5G and 4G.

BACKGROUND

As the cellular system including the 5G network supports an increasing number of devices and services including applications with a wide range of use cases and diverse needs with respect to bandwidth, latency, and reliability requirements, the cellular system may need to prioritize resources across the wireless access network and the core network (and/or for example, prioritizing across the control plane and the user plane) to support differentiation among different service data flows (SDFs). Moreover, the associated quality of service (QoS) requirements may need to be dynamic.

SUMMARY

In some example embodiments, there may be provided a method that includes receiving, at a user equipment while being served by a first system and during protocol data unit session establishment or modification procedure, a message including an access point name aggregate maximum bit rate value; and when there is an inter-system change from the first system to the second system, setting, at the user equipment, the access point name aggregate maximum bit rate value of a session management context for the second system to the received access point name aggregate maximum bit rate value received while being served by the first system.

In some variations, one or more of the features disclosed herein including the following features can optionally be included in any feasible combination. The first system may include a fifth generation core network, the second system may include a fourth generation evolved packet system, the inter-system change includes a change from an N1 interface to an S1 interface, and the access point name aggregate maximum bit rate value, maintains session continuity during the inter-system change. The message including the access point name aggregate maximum bit rate value may be received from a node in the first system. The node may include a packet data network gateway-control plane function, a session management function, and/or a packet data network gateway-control plane function co-located with the session management function. The message may include a default quality of service rule, the default quality of service rule including the access point name aggregate maximum bit rate value. The user equipment may store the access point name aggregate maximum bit rate value or the received default quality of service rule including the access point name aggregate maximum bit rate value session context management associated with the first system.

In some example embodiments, there may be provided a method that includes determining, by a network node of a network, an access point name aggregate maximum bit rate value associated with another network; and sending, by the network node, a message including the access point name aggregate maximum bit rate value for the other network to a user equipment during protocol data unit session establishment or modification procedure.

In some variations, one or more of the features disclosed herein including the following features can optionally be included in any feasible combination. The network may include a fifth generation core network, and the other network may include a fourth generation evolved packet system. The network node may include a packet data network gateway-control plane function, a session management function, and/or a packet data network gateway-control plane function co-located with the session management function. The method may include determining, by a network node of a network, a default quality of service rule including an access point name aggregate maximum bit rate value associated with another network The default quality of service rule including an access point name aggregate maximum bit rate value associated with the other network may be determined based on quality of service parameters for the first network and/or a session aggregate maximum bit rate.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

For UE mobility from the Evolved Packet System (EPS) to the 5G system (5GS), the 4G EPS may provide the UE with one or more parameters related to a 5GS-specific protocol data unit (PDU) session including session aggregate maximum bit rate (AMBR), in accordance with 3GPP TS 23.502. For example, when the UE is served by the evolved packet core (EPC) during packet data network (PDN) connection establishment, the UE may allocate a protocol data unit (PDU) session ID, and the UE may send, via protocol configuration options (PCO) message, the PDU session ID to a PDN gateway-control plane function co-located with a session management function (SMF+PGW- C). Moreover, the SMF+PGW-C may allocate other 5G QoS parameters related to the PDN connection, such as the session AMBR, QoS rules, and/or the like. Furthermore, the SMF+PGW-C may send, via the PCO message, these and other parameters to the UE.

The session AMBR may be used by the UE in accordance with 3GPP TS 24.501, for example. Upon inter-system change from the 4G S1 interface mode at the UE to 5G N1 interface mode at the UE, the UE may set the session-AMBR of the PDU session context to the session-AMBR, which is included, by the network, in the protocol configuration options information element (IE) or in the extended protocol configuration options information element (e.g., in the ACTIVATE DEFAULT EPS BEARER REQUEST message). With this approach, the UE may properly set the session AMBR of a PDU session during 4G EPS to 5GS mobility. Conversely, there is a need to set the access point name aggregate maximum bit rate (APN-AMBR) of a PDN connection, when a UE moves from the 5GS to the 4G EPS.

In some example embodiments, a PDU session establishment (or modification) procedure may trigger the SMF+PGW-C to provide to the UE at least one access point name aggregate maximum bit rate (APN-AMBR) parameter. Moreover, the SMF+PGW-C may send to the visiting session management function (V-SMF) the APN-AMBR, in accordance with some example embodiments. The UE, during mobility from the 5GS to the 4G EPS, may use the previously provided APN-AMBR to configure the APN-AMBR of the PDN connection in the EPS.

To illustrate further, the access point name (APN) refers to the name of a gateway node between a public land mobile network and a packet data network, such as the Internet. When a UE accesses the corresponding APN for example, that APN access is associated with an APN-AMBR. In 4G, the APN-AMBR may limit the aggregate bit rate across bearers, sessions, and/or PDN connections at that APN. In a 4G downlink for example, the packet gateway (P-GW) may enforce the APN-AMBR, while in the 4G uplink, the UE and/or P-GW may enforce the APN-AMBR.

Figure 1:
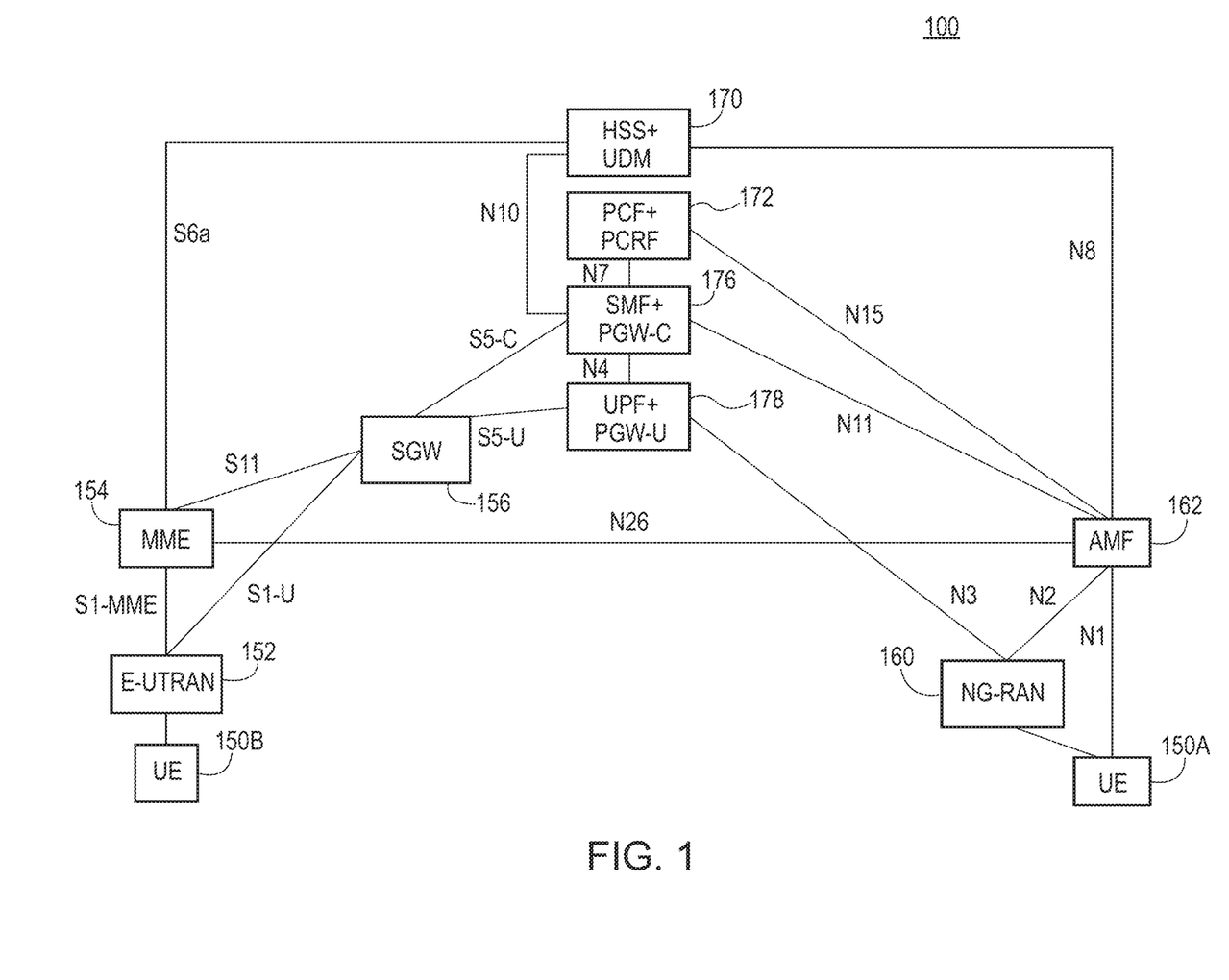
FIG. 1 depicts an example of a portion of a 4G system interworking with a 5G system, in accordance with some example embodiments.

FIG. 1 depicts an example system 100 for an interworking function (IWF) between 5G and 4G, in accordance with some example embodiments.

The system 100 may include a user equipment (UE) 150A-B, a 4G radio access network, such as the Evolved Universal Mobile Telecommunications System (UMTS) Terrestrial Radio Access Network (E-UTRAN) 152, a mobility management entity (MME) 154, a serving gateway (SGW) 156, a 5G radio access network (labeled next generation radio access network, NG-RAN) 160, and an access management function (AMF) 162.

The system 100 may also include a first node 170 including a home subscriber server co-located with unified data management function (HSS+UDM), a second node 172 including a policy control function co-located with a policy and charging rules function (PCF+PCRF), a third node 174 including a session management function co-located with a packet data network gateway-control plane function (SMF-PGW-C), and a fourth node 178 including a user plane function co-located with a packet data network gateway-user plane function (UPF-PGW-U). FIG. 1 also depicts service interfaces, such as the S1-MME, S11, N26, N1, N2, and/or the like.

The architecture including nodes (150-178) and the service interfaces may be defined in accordance with a standard, such as 3GPP TS 23.501, TS 23-502, and/or other standards, although proprietary interfaces may be used as well. Moreover, although FIG. 1 depicts a non-roaming architecture, a home routed roaming architecture, and/or a roaming architecture including a home public land mobile network and a visiting public land mobile network may be used.

After a PDU session establishment (or modification) request is initiated, the SMF-PGW-C 176 may provide to the UE 150A a 4G parameter, such as the APN-AMBR parameter. This enables interworking between 5GS and 4G as the UE now has the APN-AMBR needed to control the aggregate maximum bit rate to the access point identified by the APN after mobility from the 5G system to the 4G system.

Figure 2:
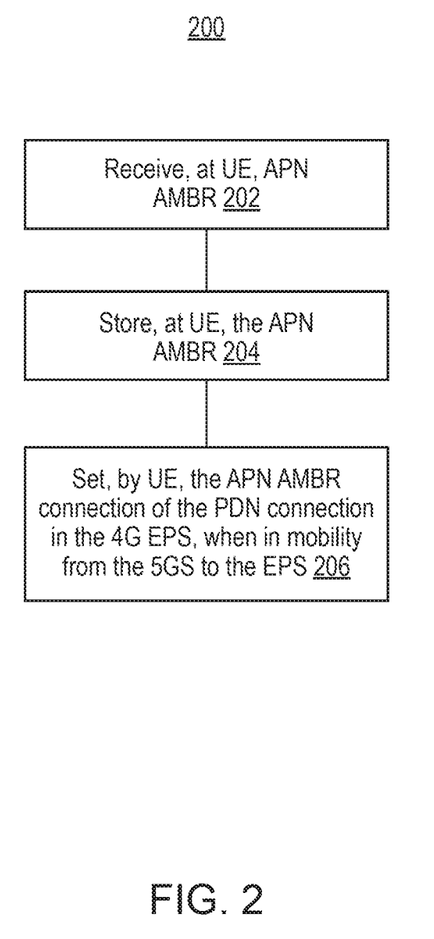
FIG. 2 depicts an example of a process for 5G to 4G interworking, in accordance with some example embodiments.

FIG. 2 depicts an example of a process 200 for 5G to 4G interworking in accordance with some example embodiments.

At 202, the UE 150A may receive, while coupled to the 5G radio access network 160, the 4G session parameter, such as an APN AMBR, in accordance with some example embodiments. For example, the UE may receive a first message having the access point name aggregate maximum bit rate value from a network, such as the 5G network, during protocol data unit session establishment or modification procedure. The first message may include a default quality of service rule having the having the access point name aggregate maximum bit rate value or it may include a Mapped EPS bearer context information element incorporating the access point name aggregate maximum bit rate value. To illustrate further, after a session establishment request such as a PDU session request message being sent from the UE to the AMF 162, this may trigger the SMF-PGW-C 176 (which may be selected by the AMF as part of SMF selection in accordance with 3GPP TS 23.502) to send to the UE 150A the APN AMBR. This APN AMBR may be carried, via the A1, by an Nsmf_PDUSession_CreateSM-Context Response message to the AMF, which may forward, via the N1 interface, the APN AMBR as well as other QoS and related information to the UE 150A. Alternatively or additionally, a network or UE requested session modification request may also trigger the SMF-PGW-C 176 to send to the UE the APN AMBR. The session establishment, or modification, requests may be during a roaming mode, a non-roaming mode, or a home-routed roaming mode.

At 204, the UE 150A may store the received APN AMBR with other QoS information and session information. The UE 150A may store the association between a QoS flow, corresponding to an EPS bearer ID (EBI), and the EPS QoS parameters and the APN-AMBR mappings.

When the UE 150A moves from the 5G radio access node 160 to the 4G radio access node 152 as shown at 150B, this may trigger, as part of interworking between 5G and 4G, the UE 150B to set, at 206, the APN AMBR of a packet data network (PDN) connection from the UE to the corresponding PDN. For example, the UE may set the APN AMBR of the default EPS bearer context using the APN-AMBR received (at 202 while coupled to the 5G core) in the parameters of the default QoS rule in the PDU session context or in the relevant session establishment, or modification, message for example in a suitable information element, such as in an EPS bearer context information element or present in the message in any suitable form. In this way, the session context is converted to maintain session continuity, during handover, for a service, session, or network slice (e.g. for an application at the UE). And when set, the UE may police the 4G connection based on the APN AMBR setting.

When the UE 150A is served by the 5GS including the NG-RAN 160 during PDU session establishment (or PDU session modification and/or guaranteed bit rate (GBR) QoS flow establishment), the SMF+PGW-C 176 may perform EPS QoS and APN-AMBR mappings. The mappings may be based on the 5G QoS parameters and a session AMBR obtained from the PCF+PCRF 172, EPS QoS and APN-AMBR mappings. The SMF+PGW-C 176 may also allocate traffic flow templates (TFT) with the PCC rules (if deployed) obtained from the PCF+PCRF 172; otherwise, the EPS QoS and APN-AMBR mappings and TFT allocation may be executed by the SMF+PGW-C locally. The SMF+PGW may ignore the 5G QoS parameters that are not applicable to the 4G EPC, such as QoS Notification control.

For each PDU Session, the SMF+PGW-C may allocate EPS bearer IDs (EBIs) to the default EPS bearer (which non GBR flows are mapped to) and dedicated bearers (which the GBR Flows are mapped to in EPC). The UE may also receive the mapped QoS parameters and the APN-AMBR. The UE and the SMF+PGW-C may store the association between the QoS flow and the corresponding EBI and the EPS QoS parameters including the APN-AMBR mappings.

When the SMF+PGW-C 176 (which invokes an Namf_Communication_EBIAssignment Request) receives any EBI(s) from the AMF, the SMF+PGW-C may include the received EBI(s) into the mapped EPS QoS parameters and APN-AMBR (in case the EPS bearer is a default EPS bearer) to be sent to the UE in the N1SM container. The SMF+PGW-C may also include (in an N2 session management container for the 5G RAN 160) the mapping between the received EBI(s) and QFI(s).

In the case of home routed roaming, the SMF+PGW-C 176 may generate an EPS bearer context which includes PGW-C control plane tunnel information and APN-AMBR of the PDN connection corresponding to the PDU session (in case of PDU session establishment procedure), the EBI for each EPS bearer, the PGW-U tunnel information for each EPS bearer, and the EPS QoS parameters for each EPS bearer. The SMF+PGW-C may then send the generated information to a visiting SMF. This generated information may be carried by an Nsmf_PDU Session Create Response (e.g., for PDU Session Establishment) or by an Nsmf_PDUSession_Update Request (e.g., for PDU Session Modification). The visiting SMF may store the EPS bearer context.

In some example embodiments, the PDU SESSION MODIFICATION COMMAND and the PDU SESSION ESTABLISHMENT ACCEPT messages may include a QoS rule (or a default QoS rule), or information element, which may include the APN-AMBR as well as the EPS bearer identity, the mapped EPS QoS parameters, the mapped extended EPS QoS parameters, and the mapped traffic flow template (if the QoS flow can be mapped to an EPS bearer). The APN-AMBR (as well as the other mapped parameters) may be stored as part of the PDU session context in the UE, so it can be mapped to another context, session, slice, and/or the like.

Moreover, when there is an intersystem change from N1 mode to S1 mode, the UE may create the default EPS bearer context from APN-AMBR of a PDU session context, whether in a QoS flow of a default QoS rule or otherwise, for which interworking to EPS is supported. The UE may use the APN-AMBR of the PDU session context to set the APN-AMBR of the corresponding default EPS bearer context. If there are more than one APN-AMBR received from the network for the same data network name (which will be mapped to a single APN), the UE may use the most recent APN-AMBR.

In case of the home-routed roaming scenario, the PDU SESSION MODIFICATION COMMAND and the PDU SESSION ESTABLISHMENT ACCEPT messages may not be sent directly by the SMF+PGW-C to the UE. When this is the case, the "201 Created" of the Nsmf_PDUSession_Create service and the PATCH request of Nsmf_PDUSession_Update service may include the APN-AMBR.

Figure 3:
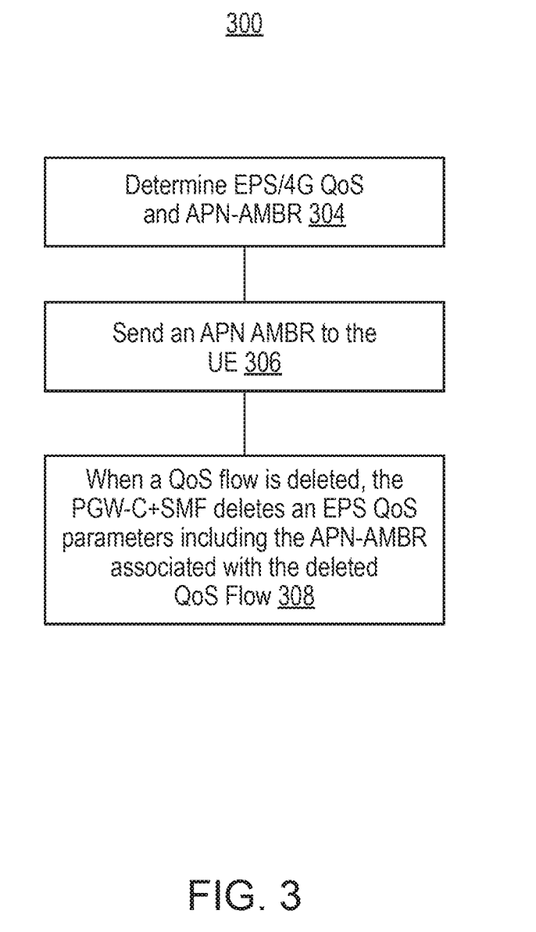
FIG. 3 depicts another example of a process for 5G to 4G interworking, in accordance with some example embodiments.

FIG. 3 depicts an example process at a network node, in accordance with some example embodiments.

At 304, the SMF+PGW-C 176 may determine 4G QoS information and APN-AMBR parameter, in accordance with some example embodiments. For example, the SMF+PGW-C may perform, based on the 5G QoS parameters and a session AMBR obtained from the PCF+PCRF 172 as well as EPS QoS information and APN-AMBR mappings.

At 306, the SMF+PGW-C 176 may send the APN AMBR to the UE 150A, in accordance with some example embodiments. While the UE is coupled to the 5G radio access network 160, the SMF+PGW-C 176 may send the APN AMBR. As noted, after a session establishment (or modification) request, this may trigger the SMF-PGW-C 176 (which may be selected by the AMF as part of SMF selection in accordance with 3GPP TS 23.502) to send to the UE 150A the APN AMBR. As noted, the APN AMBR may be carried, via the N11, by an Nsmf_PDUSession_CreateSMContext Response message to the AMF, which may forward, via the N1 interface, the APN AMBR as well as other QoS and related information to the UE 150A. Alternatively or additionally, a network or UE requested session modification request may also trigger the SMF-PGW-C 176 to send to the UE the APN AMBR. The session establishment, or modification, requests may be during a roaming mode, a non-roaming mode, or a home-routed roaming mode.

At 308, the SMF+PGW-C 176 may delete the EPS QoS information and the APN AMBR associated with a deleted QoS flow, in accordance with some example embodiments. When a QoS flow is deleted (e.g., due to PDU Session status synchronization or PDU session modification), the UE and/or the SMF+PGW-C may delete any existing EPS QoS parameters including the APN-AMBR associated with the deleted QoS Flow. In some example embodiments, the SMF+PGW-C 172 may receive, from the AMF 162, an indication that an EBI has been revoked. If for example the AMF is requested to assign an EPS bearer identity (EBI) for QoS flow(s) for high priority service but the AMF has no available EBIs, the AMF may revoke an EBI that was assigned to one or more QoS flow. The revocation may be based on the at least one allocation and retention priority (ARP), single Network Slice Selection Assistance Information (S-NSSAI), EBIs information (in the UE context), and local policies. If an assigned EBI is to be revoked, the AMF may send a message, such as an Nsmf_PDUSession_Update SM Context including the EBIs to be revoked. This message may be sent to request the related SMF (e.g., the SMF+PGW-C) to release the mapped EPS QoS parameters and APN-AMBR (in case the EPS bearer is a default EPS bearer) corresponding to the EBI to be revoked. The AMF may store the association of the assigned EBI-ARP pair to the corresponding PDU Session ID and SMF address. In response, the related SMF, such as the SMF+PGW-C acting as the SMF serving the released resources, may send to the AMF (and via the N2 interface) a Nsmf_Communication_N1N2Message Transfer including the session management information along with a PDU session ID and the EBI(s) to be revoked. This information may be carried in an N2 and/or N1 session management (SM) container to be revoked. This message may inform the access network and ultimately the UE to remove the mapped EPS QoS parameters and APN-AMBR (in case the EPS bearer is a default EPS bearer) corresponding to the EBI(s) to be revoked. To inform the UE, the Nsmf_Communication_N1N2Message may include an N1 SM container including the mapped EPS QoS parameters and APN-AMBR to be removed.

Figure 4:
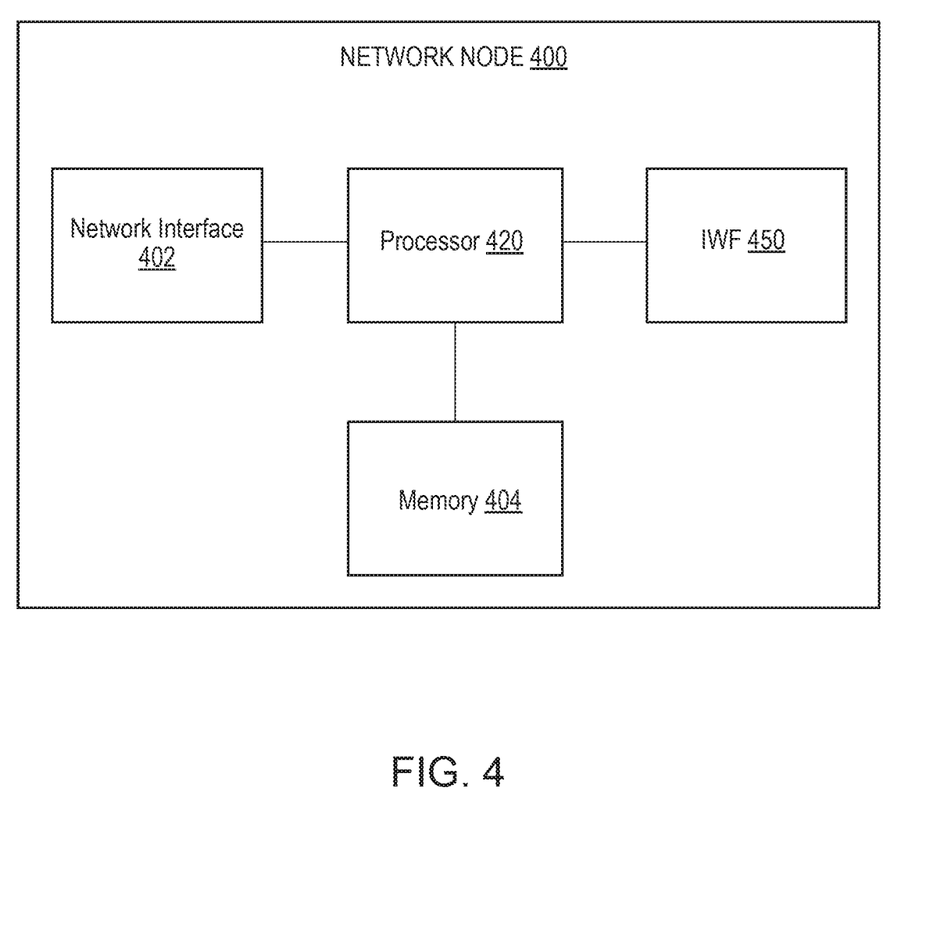
FIG. 4 depicts an example of a network node, in accordance with some example embodiments.

FIG. 4 depicts a block diagram of a network node 400, in accordance with some example embodiments. The network node 900 may be configured to provide a network node, such as the AMF 162, SMF+PGW-C 176, and/or other nodes such as those depicted at FIG. 1.

The network node 400 may include a network interface 402, a processor 420, a memory 404, and an interworking function 450 configured to provide one or more operations disclosed herein with respect to a network node (e.g., process 300 and/or the like). The network interface 402 may include wired and/or wireless transceivers to enable access other nodes, the Internet, and/or other nodes. The memory 904 may comprise volatile and/or non-volatile memory including program code, which when executed by at least one processor 420 provides, among other things, the processes disclosed herein including process 300 and/or the like. For example, the network node may be configured to at least determine a default quality of service rule including an access point name aggregate maximum bit rate value associated with another network, or simply determine an access point name aggregate maximum bit rate value, and send a message including the default quality of service rule including the access point name aggregate maximum bit rate value for the other network, or the message simply including an access point name aggregate maximum bit rate value, to a user equipment during protocol data unit session establishment or modification procedure.

Figure 5:
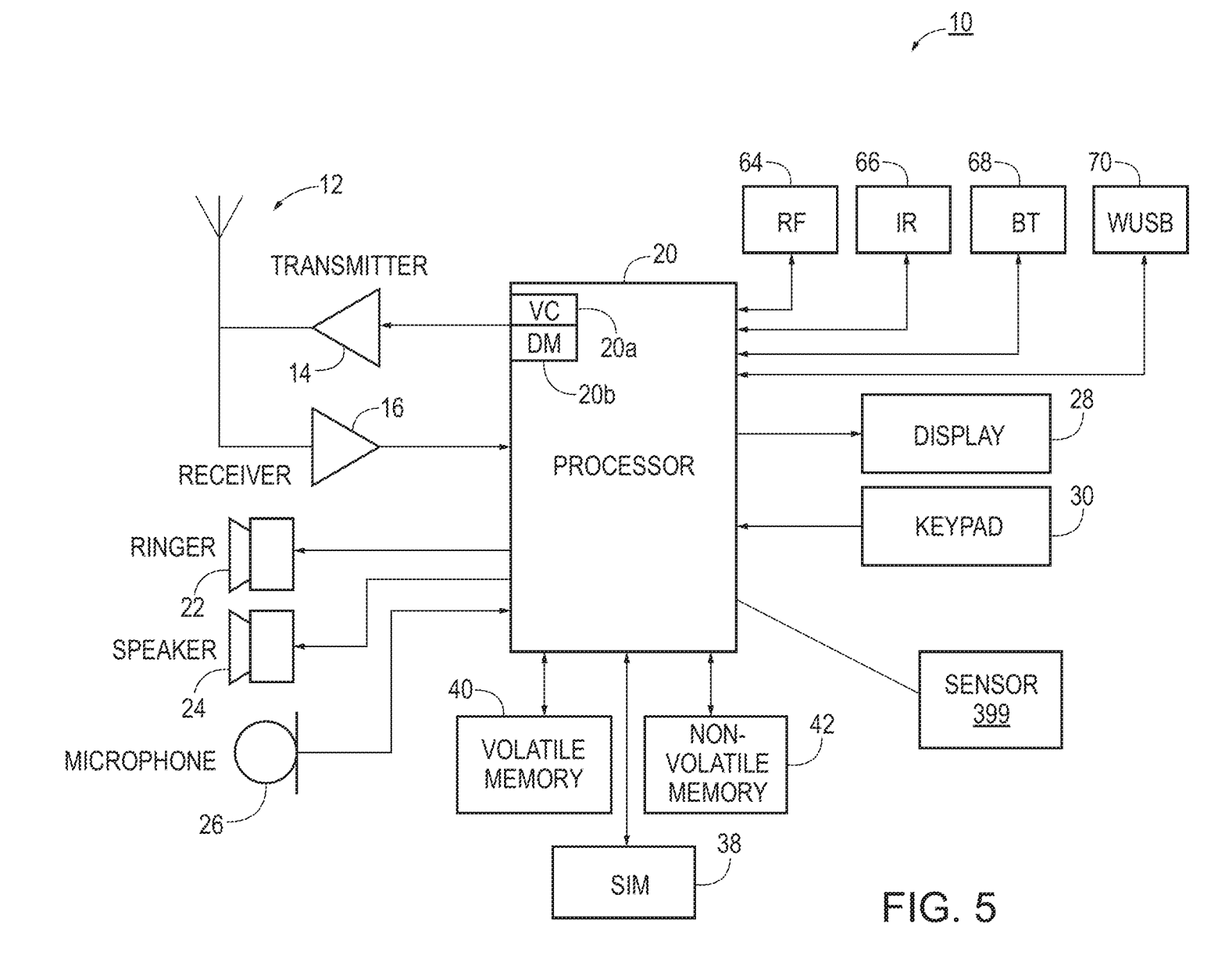
FIG. 5 depicts an example of an apparatus, in accordance with some example embodiments.

FIG. 5 illustrates a block diagram of an apparatus 10, in accordance with some example embodiments.

The apparatus 10 may represent a user equipment, such as the user equipment 150.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE) Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/ or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including receiving, at a user equipment, a first message including a default quality of service rule from a network during protocol data unit session establishment or modification procedure, the default quality of service rule including an access point name aggregate maximum bit rate value, or the first message simply including the access point name aggregate maximum bit rate value; and when there is an inter-system handover from the network to another network, sending, by the user equipment, a second message including the access point name aggregate maximum bit rate value, the second message being sent to the other network during a procedure to activate, at the other network, a default bearer context using at least the access point name aggregate maximum bit rate value.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to at least receive a first message including a default quality of service rule from a network during protocol data unit session establishment or modification procedure, the default quality of service rule including an access point name aggregate maximum bit rate value, or the first message simply including the access point name aggregate maximum bit rate value; and when there is an inter-system handover from the network to another network, send message including the access point name aggregate maximum bit rate value, the second message being sent to the other network during a procedure to activate, at the other network, a default bearer context using at least the access point name aggregate maximum bit rate value.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced interworking between 5G and 4G.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, at a user equipment, while being served by a first system and during a protocol data unit session establishment procedure or a protocol data unit session modification procedure, a message including a received access point name aggregate maximum bit rate value of a second system; and
   in an instance in which there is an inter-system change from the first system to the second system, setting, at the user equipment, an access point name aggregate maximum bit rate value of a session management context for the second system to the received access point name aggregate maximum bit rate value received while being served by the first system.

2. The method of claim 1, wherein the first system comprises a fifth generation core network, wherein the second system comprises a fourth generation evolved packet system, wherein the inter-system change includes a change from an Ni interface to an Si interface, and wherein setting the access point name aggregate maximum bit rate value of the session management context for the second system to the received access point name aggregate maximum bit rate value maintains session continuity during the inter-system change.

3. The method of claim 1, wherein the message including the received access point name aggregate maximum bit rate value is received from a node in the first system.

4. The method of claim 3, wherein the node comprises a packet data network gateway-control plane function, a session management function, and/or a packet data network gateway-control plane function co-located with the session management function.

5. The method of claim 1, further comprising:
   storing, at the user equipment, the received access point name aggregate maximum bit rate value for a session management context associated with the second system.

6. An apparatus comprising:
   at least one processor; and
   at least one memory including computer program code, the at least one memory and the computer program code configured to, with the at least one processor, cause the apparatus to at least:
   receive, while being served by a first system and during a protocol data unit session establishment procedure or a protocol data unit session modification procedure, a message including a received access point name aggregate maximum bit rate value of a second system; and
   in an instance in which there is an inter-system change from the first system to the second system, set the access point name aggregate maximum bit rate value of a session management context for the second system to the received access point name aggregate maximum bit rate value received while being served by the first system.

7. The apparatus of claim 6, wherein the first system comprises a fifth generation core network, wherein the second system comprises a fourth generation evolved packet system, wherein the inter-system change includes a change from an N1 interface to an Si interface, and wherein the apparatus being caused to set the access point name aggregate maximum bit rate value of the session management context for the second system to the received access point name aggregate maximum bit rate value maintains session continuity during the inter-system change.

8. The apparatus of claim 6, wherein the message including the received access point name aggregate maximum bit rate value is received from a node in the first system.

9. The apparatus of claim 8, wherein the node comprises a packet data network gateway-control plane function, a session management function, and/or a packet data network gateway-control plane function co-located with the session management function.

10. The apparatus of claim 6, wherein the apparatus is further caused to at least:
    store the received access point name aggregate maximum bit rate value for a session management context associated with the second system.

11. The apparatus of claim 6, wherein the apparatus comprises or is comprised in a user equipment.

12. A non-transitory computer-readable storage medium comprising program code which when executed by at least one processor, causes operations comprising:
  receiving, at a user equipment while being served by a first system and during a protocol data unit session establishment procedure or a protocol data unit session modification procedure, a message including a received access point name aggregate maximum bit rate value of a second system; and
  in an instance in which there is an inter-system change from the first system to the second system, setting, at the user equipment, an access point name aggregate maximum bit rate value of a session management context for the second system to the received access point name aggregate maximum bit rate value received while being served by the first system.

13. The non-transitory computer-readable storage medium of claim 12, wherein the first system comprises a fifth generation core network, wherein the second system comprises a fourth generation evolved packet system, wherein the inter-system change includes a change from an N1 interface to an Si interface, and wherein setting the access point name aggregate maximum bit rate value to the received access point name aggregate maximum bit rate value maintains session continuity during the inter-system change.

14. The non-transitory computer-readable storage medium of claim 12, wherein the message including the received access point name aggregate maximum bit rate value is received from a node in the first system.

15. The non-transitory computer-readable storage medium of claim 14, wherein the node comprises a packet data network gateway-control plane function, a session management function, and/or a packet data network gateway-control plane function co-located with the session management function.

16. The non-transitory computer-readable storage medium of claim 14, further comprising program code which, when executed by the at least one processor, causes operations comprising:
  storing, at the user equipment, the received access point name aggregate maximum bit rate value for a session management context associated with the second system.

17. A method comprising:
  receiving, at a user equipment, while being served by a first system and during a protocol data unit session establishment procedure or a protocol data unit session modification procedure, an access point name aggregate maximum bit rate value for a second system; and
  in an instance in which there is an inter-system change from the first system to the second system, setting, by the user equipment, absent instructions received from the first system or the second system, the access point name aggregate maximum bit rate value for a session management context associated with the second system.

18. The method of claim 17, wherein the first system comprises a fifth generation core network, wherein the second system comprises a fourth generation evolved packet system, wherein the inter-system change includes a change from an Ni interface to an Si interface, and wherein setting the access point name aggregate maximum bit rate value for the session management context associated with the second system maintains session continuity during the inter-system change.

19. The method of claim 17, wherein the message including the access point name aggregate maximum bit rate value is received from a node in the first system.

20. The method of claim 19, wherein the node comprises a packet data network gateway-control plane function, a session management function, and/or a packet data network gateway-control plane function co-located with the session management function.

21. An apparatus comprising:
  at least one processor; and
  at least one memory including computer program code, the at least one memory and the computer program code configured to, with the at least one processor, cause the apparatus to at least:
    receive, while being served by a first system and during a protocol data unit session establishment procedure or a protocol data unit session modification procedure, an access point name aggregate maximum bit rate value for a second system; and
    in an instance in which there is an inter-system change from the first system to the second system, set, absent instructions received from the first system or the second system, the access point name aggregate maximum bit rate value for a session management context associated with the second system.

22. The apparatus of claim 21, wherein the first system comprises a fifth generation core network, wherein the second system comprises a fourth generation evolved packet system, wherein the inter-system change includes a change from an N1 interface to an Si interface, and wherein the apparatus being caused to set the access point name aggregate maximum bit rate value for the session management context associated with the second system maintains session continuity during the inter-system change.

23. The apparatus of claim 21, wherein the message including the access point name aggregate maximum bit rate value is received from a node in the first system.

24. The apparatus of claim 23, wherein the node comprises a packet data network gateway-control plane function, a session management function, and/or a packet data network gateway-control plane function co-located with the session management function.

25. The apparatus of claim 21, wherein the apparatus comprises or is comprised in a user equipment.

26. A non-transitory computer-readable storage medium comprising program code which when executed by at least one processor causes operations comprising:
  receiving, at a user equipment, while being served by a first system and during a protocol data unit session establishment procedure or a protocol data unit session modification procedure, an access point name aggregate maximum bit rate value for a second system; and
  in an instance in which there is an inter-system change from the first system to the second system, setting, by the user equipment, absent instructions received from the first system or the second system, the access point name aggregate maximum bit rate value for a session management context associated with the second system.

* * * * *

UNITED STATES PATENT AND TRADEMARK OFFICE
CERTIFICATE OF CORRECTION

PATENT NO. : 11,323,934 B2
APPLICATION NO. : 16/357887
DATED : May 3, 2022
INVENTOR(S) : Sung Hwan Won et al.

It is certified that error appears in the above-identified patent and that said Letters Patent is hereby corrected as shown below:

In the Claims

In Column 12, Line 5, Claim 2, delete "Ni interface to an Si interface," and insert -- N1 interface to an S1 interface, --, therefor.

In Column 12, Line 47, Claim 7, delete "N1 interface to an Si interface," and insert -- N1 interface to an S1 interface, --, therefor.

In Column 13, Line 2, Claim 12, delete "which" and insert -- which, --, therefor.

In Column 13, Line 22, Claim 13, delete "N1 interface to an Si interface," and insert -- N1 interface to an S1 interface, --, therefor.

In Column 13, Line 62, Claim 18, delete "Ni interface to an Si interface," and insert -- N1 interface to an S1 interface, --, therefor.

In Column 14, Line 33, Claim 22, delete "N1 interface to an Si interface," and insert -- N1 interface to an S1 interface, --, therefor.

Signed and Sealed this
Thirtieth Day of May, 2023

Katherine Kelly Vidal
*Director of the United States Patent and Trademark Office*